(12) United States Patent
Lee (10) Patent No.: US 8,738,815 B2
(45) Date of Patent: May 27, 2014

(54) SYSTEM AND METHOD FOR VIRTUALIZING THE PERIPHERALS IN A TERMINAL DEVICE TO ENABLE REMOTE MANAGEMENT VIA REMOVABLE PORTABLE MEDIA WITH PROCESSING CAPABILITY

(71) Applicant: Kwang Wee Lee, Singapore (SG)

(72) Inventor: Kwang Wee Lee, Singapore (SG)

(73) Assignee: Cassis International Pte Ltd, Singapore (SG)

( * ) Notice: Subject to any disclaimer, the term of this patent is extended or adjusted under 35 U.S.C. 154(b) by 0 days.

(21) Appl. No.: 13/795,727

(22) Filed: Mar. 12, 2013

(65) Prior Publication Data

US 2013/0219090 A1    Aug. 22, 2013

Related U.S. Application Data

(63) Continuation of application No. 12/386,212, filed on Apr. 14, 2009, now Pat. No. 8,396,992.

(60) Provisional application No. 61/206,454, filed on Jan. 30, 2009, provisional application No. 61/206,453, filed on Jan. 30, 2009, provisional application No. 61/206,427, filed on Jan. 30, 2009, provisional application No. 61/206,797, filed on Feb. 4, 2009.

(51) Int. Cl.
*G06F 3/00* (2006.01)
*G06F 9/455* (2006.01)

(52) U.S. Cl.
USPC ............. 710/5; 710/8; 718/1; 455/73; 455/91

(58) Field of Classification Search
None
See application file for complete search history.

(56) References Cited

U.S. PATENT DOCUMENTS

| 7,809,366 | B2 * | 10/2010 | Rao et al. ................... 455/419 |
| 2007/0242697 | A1 * | 10/2007 | Caulfield ..................... 370/469 |
| 2007/0254634 | A1 * | 11/2007 | Costa-Requena et al. . 455/412.1 |
| 2008/0020755 | A1 * | 1/2008 | Liu et al. ................... 455/432.1 |
| 2008/0146178 | A1 * | 6/2008 | Lu et al. .................... 455/187.1 |
| 2009/0061840 | A1 * | 3/2009 | Fleischman et al. .......... 455/419 |
| 2009/0197641 | A1 * | 8/2009 | Rofougaran et al. ...... 455/556.1 |
| 2009/0198851 | A1 * | 8/2009 | Rofougaran .................. 710/300 |
| 2011/0107329 | A1 * | 5/2011 | Betzler et al. ..................... 718/1 |

* cited by examiner

*Primary Examiner* — Michael Sun
(74) *Attorney, Agent, or Firm* — James R. Klaiber; Pryor Cashman LLP (57) ABSTRACT

Systems and methods for virtualizing the peripherals in a wireless device to enable remote management via removable portable media with processing capability are described. One aspect may include a system for virtualizing a peripheral device of a wireless device from a media device, the system comprising a media device, including a first memory; a processor coupled to said first memory; and a virtualization device controller interface remote layer adapted to run on said processor and first memory, wherein said virtualization device controller interface remote layer is adapted to communicate with a peripheral device of the wireless device.

18 Claims, 7 Drawing Sheets

SYSTEM AND METHOD FOR VIRTUALIZING THE PERIPHERALS IN A TERMINAL DEVICE TO ENABLE REMOTE MANAGEMENT VIA REMOVABLE PORTABLE MEDIA WITH PROCESSING CAPABILITY

CROSS-REFERENCE TO RELATED APPLICATIONS

This application claims priority to U.S. Non-Provisional application Ser. No. 12/386,212, filed Apr. 14, 2009, which will issue on Mar. 12, 2013 as U.S. Pat. No. 8,396,992, the disclosure of which is incorporated by reference herein. That application itself claims priority on U.S. Provisional Patent Application Ser. Nos. 61/206,454, 61/206,453, and 61/206,427, filed Jan. 30, 2009, and U.S. Provisional Patent Application Ser. No. 61/206,797, filed Feb. 4, 2009, the disclosures of which are incorporated herein by reference.

FIELD OF THE INVENTION

The present invention relates to a system and method for virtualizing the peripherals in a terminal device to enable remote management via removable portable media with processing capability.

BACKGROUND OF THE INVENTION

Current wireless device or wireless handset designs function with the software layer running on the main processor or application processor with direct access to the attached peripherals such as but not limited to the display, keyboard, communication hardware, codec, printer, camera, and network hardware. The application and runtime environments are dependent on the hardware architecture and operating system of each wireless device or wireless handset. The runtime environment accesses the hardware via a hardware framework layer that controls the hardware using the embedded operating system and associated device drivers. Substantial efforts are required to maintain the applications and runtime environment when porting software, particularly when wireless device features are enhanced and the operating system is upgraded.

SUMMARY OF THE INVENTION

It may be desirable to have a system and method for virtualizing the peripherals in a wireless device to enable remote management via removable portable media with processing capability. This makes the runtime environment and application independent of the wireless radio hardware that is implemented on the wireless handset. The removable media with the processor and installed software can be connected to any other wireless handset with a different wireless radio hardware configuration and still function properly.

In certain aspects, the present invention may provide a method. In one aspect, the method may include a remote processor package housed in removable media virtualizing hardware on a terminal or wireless handset device.

In one aspect, the present invention may provide for a remote processor package system housed in removable media. One aspect may include a system for virtualizing a peripheral device of a wireless device from a media device, the system comprising a media device, including a first memory; a processor coupled to said first memory; and a virtualization device controller interface remote layer adapted to run on said processor and first memory, wherein said virtualization device controller interface remote layer is adapted to communicate with a peripheral device of the wireless device. Another aspect may include a method for virtualizing a peripheral device of a wireless device from a media device comprising emulating, on the media device, a hardware interface for communicating with a runtime environment; receiving, on the media device, a hardware configuration of the wireless device; mapping, by a virtualization device controller interface remote layer on the media device, a peripheral device of the wireless device to said emulated hardware interface so the media device operates as if directly connected to a peripheral device; transmitting, from the media device, a logical port for a peripheral device on the wireless device; wrapping, by said virtualization device controller interface remote layer on the media device, peripheral device commands into packets; transmitting, by said virtualization device controller interface remote layer on the media device, said wrapped packets containing said peripheral device commands to the wireless device; and executing commands, by the media device, as if a peripheral device of the wireless device is directly connected to the media device.

BRIEF DESCRIPTION OF THE DRAWINGS

Features and other aspects of embodiments of the present invention are explained in the following description taking in conjunction with the accompanying drawings, wherein.

DETAILED DESCRIPTION

Various embodiments of the present invention will now be described.

Figure 1:
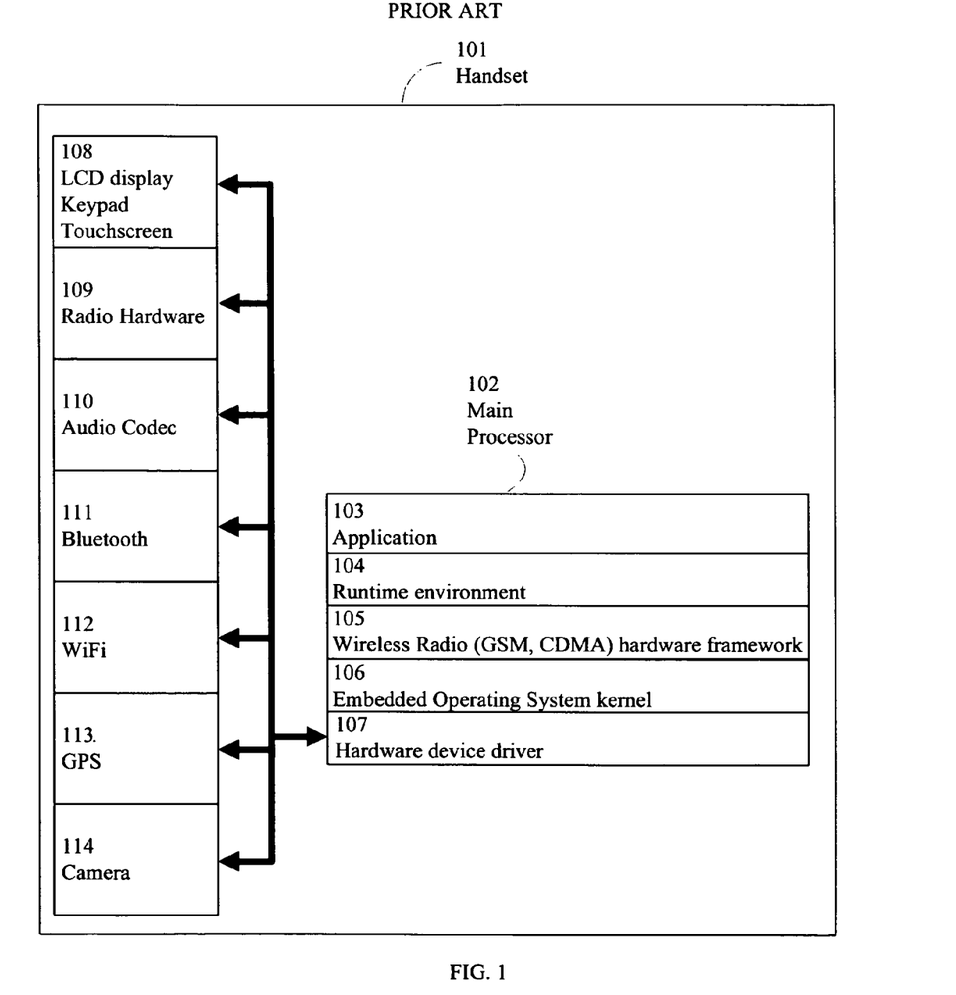
FIG. 1 illustrates a wireless handset block diagram for a typical wireless handset.

As shown in FIG. 1, typical architecture for a wireless device includes a processor 102 located with the rest of the interface hardware in the wireless handset 101. Interface hardware may include an LCD display, keypad or touchscreen 108, radio hardware 109, an audio codec 110, Bluetooth 111, Wireless Fidelity ("WiFi") 112, GPS 113, and a camera 114, each connected to the main processor 102 through a hardware device driver 107. Additionally, the handset 101 also includes an application 103, a runtime environment 104, a wireless radio hardware framework 105, and an embedded operating system kernel 106.

One aspect of the present invention may include a method where the application software 103, runtime environment 104, external communications framework (including but not limited to wireless or fixed copper wire) 105 and embedded operating system 106 of a terminal device 201 or wireless handset can be managed remotely via a communication link 203 from a removable media device with processing capability 202. In one aspect, the communication link 203 may be a bus, such as USB. In other aspects, the communication link 203 may be a wireless connection. In further aspects, the communication link 203 may be a high-speed bus. Further aspects include, but are not limited to Universal Serial Bus ("USB"), Secure Digital ("SD"), micro Secure Digital ("micro SD"), Subscriber Identity Module ("SIM"), Security Authentication Module ("SAM"), and Multimedia Card ("MMC") as a communication link 203.

In other aspects, a terminal device 201 or wireless handset refers to a device having a processor 301 with RAM, ROM, and an embedded OS running on it. In further aspects, the removable media device 202 may contain at least one processor, a memory, and other circuitry having a communication link 203. Other aspects may package the removable media device 202 in form factors including but not limited to SIM, SAM, SD, micro SD, MMC, or USB.

In one aspect, the terminal device 201 and the removable media device 202 may communicate via a virtualization device controller interface ("VDCI"). In further aspects, the VDCI implementation on the terminal device 201 is referred to as the VDCI device or VDCI device daemon 205. In other aspects the VDCI implementation on the removable media device 202 is referred to as the VDCI remote or VDCI remote layer 204. In one aspect, the VDCI device daemon 205 in the terminal device 201 is a software program that is run on the basic processor or baseband processor 301 within the terminal device 201. In another aspect, the VDCI remote layer 204 is a daemon that resides above the embedded operating system 106 and under the hardware framework 105 of the runtime environment 104 or window system of the removable media device 202.

One aspect uses virtualization to virtualize the peripherals in the terminal device 201, and enable the application 103 in the removable media device 202 to control these peripherals via a communication link 203. Further aspects may have a terminal device 201 having a thin layer of software called a VDCI device 205 to virtualize and manage all the peripherals, without the need for a full application residing in the terminal device 201. Another aspect may include a VDCI remote 204 in the removable media device 202 which may receive requests from the application software 103. In further aspects, the VDCI remote 204 will communicate to the VDCI device 205. In other aspects, the VDCI device 205 will direct the VDCI remote communication 204 to the appropriate physical device or peripheral for proper operation.

Figure 2:
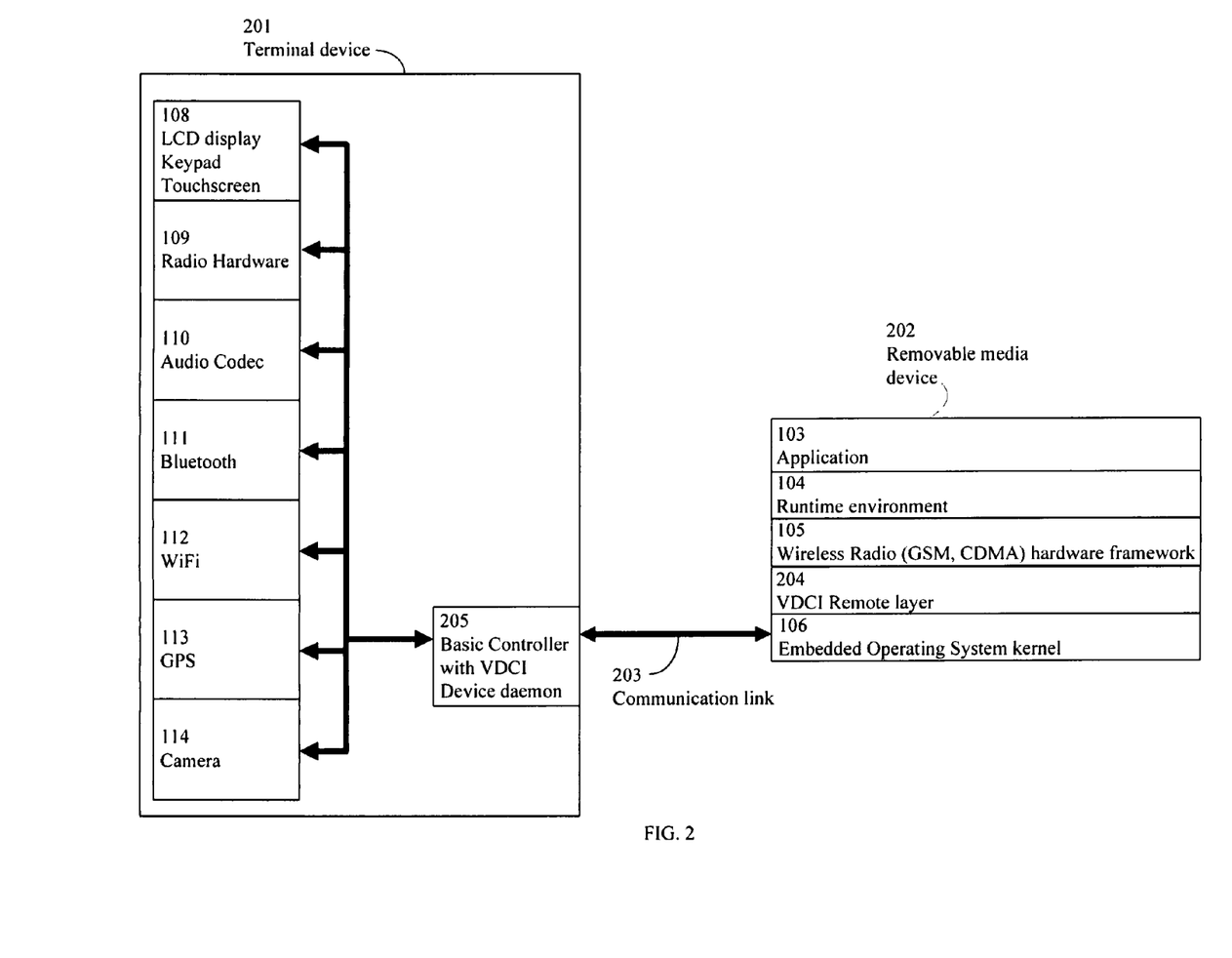
FIG. 2 illustrates a wireless handset block diagram for a processor in a removable media device according to one aspect of the system and method of the present disclosure.

In another aspect, the terminal device 201 may only require the installation of the VDCI device daemon 205. In other aspects, the removable media device 202 may require the installation of a corresponding VDCI remote layer 204. In further aspects, the applications 103 residing in the removable device 202 may be run with any terminal device 201 having a VDCI device 205 installed, without the need to customize and conduct further acceptance testing. FIG. 2 illustrates one aspect depicting a terminal device 201 having a VCDI device daemon 205 interacting with a removable media device 202 having a VDCI remote layer 204. In one aspect, the removable media device 202 may be connected to the terminal device 201 via a communication link 203. In one aspect, the terminal device 201 may include a processor 301 that may control hardware devices and peripherals such as radio hardware 109, Bluetooth 111, an audio codec 110, WiFi 112, GPS 113, a display 108, and a camera 114. In further aspects, the processor 301 in the terminal device 201 may be connected to the removable media device 202 via a communication link 203.

In one aspect, the VDCI remote layer 204 may map the hardware in a wireless terminal device 201 having a VDCI device daemon 205 to enable the runtime environment 104 and applications 103 in the removable device 202 to access the hardware on the terminal device 201. In further aspects, the VDCI remote layer 204 may allow applications 103 and the runtime environment 104 on the removable media device 202 to access hardware on the terminal device 201 directly, instead of accessing hardware through the removable media device 202 operating system 106 that does not have any hardware drivers implemented. Other aspects allow the runtime environment 104 and application 103 to function independently of the hardware present in the terminal device 201. Further aspects require an update on the VDCI device daemon 205 for new hardware variations to map to an existing VDCI remote layer 204 implementation. In another aspect, the user with the removable media device 202 may plug it into any other terminal device 201 having a VDCI device daemon 205 while maintaining the applications 103 and the user interfaces on the removable media device 202, which may achieve user and application portability.

Figure 3:
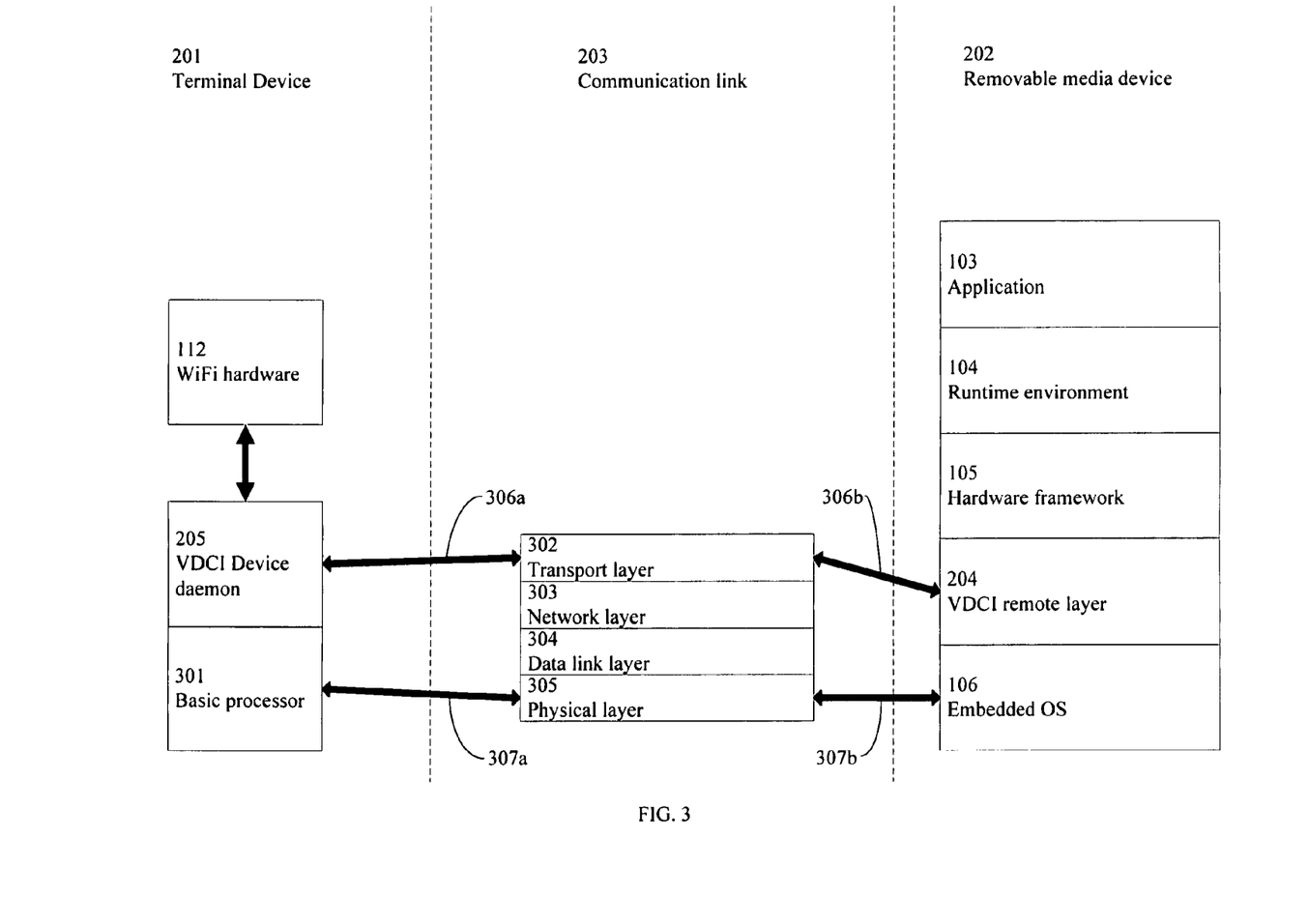
FIG. 3 illustrates a block diagram for the communication between a wireless handset and a removable media device according to one aspect of the system and method of the present disclosure.

In one aspect, the VDCI may be implemented using Peer to Peer communication on the transport layer 302 of the communication link 203 between the terminal device 201 and the removable media device 202. Other aspects may use client to server communication on the transport layer of the communication link between the terminal device 201 and the removable media device 202. The transport layer 302 may be responsible for delivering data to the appropriate application process on the host computer. In one aspect, FIG. 3 shows the logical data exchange between the removable media device 202 and the terminal device 201. In FIG. 3, WiFi hardware 112 is mapped to the VDCI remote layer 204 in the removable media device 202 using the transport layer 302 of the communication link 203. In one aspect, the communication link 203 may also include a network layer 303, a data link layer 304, and a physical layer 305. In further aspects, the VDCI remote layer 204 is mapped to the transport layer 302, as shown by 306b, and the transport layer 302 is mapped to the VDCI device daemon 205, as shown by 306a. In another aspect, the embedded OS 106 is mapped to the physical layer 305, as shown by 307b, and the physical layer 305 is mapped to the basic processor 301, as shown by 307a.

Figure 4A:
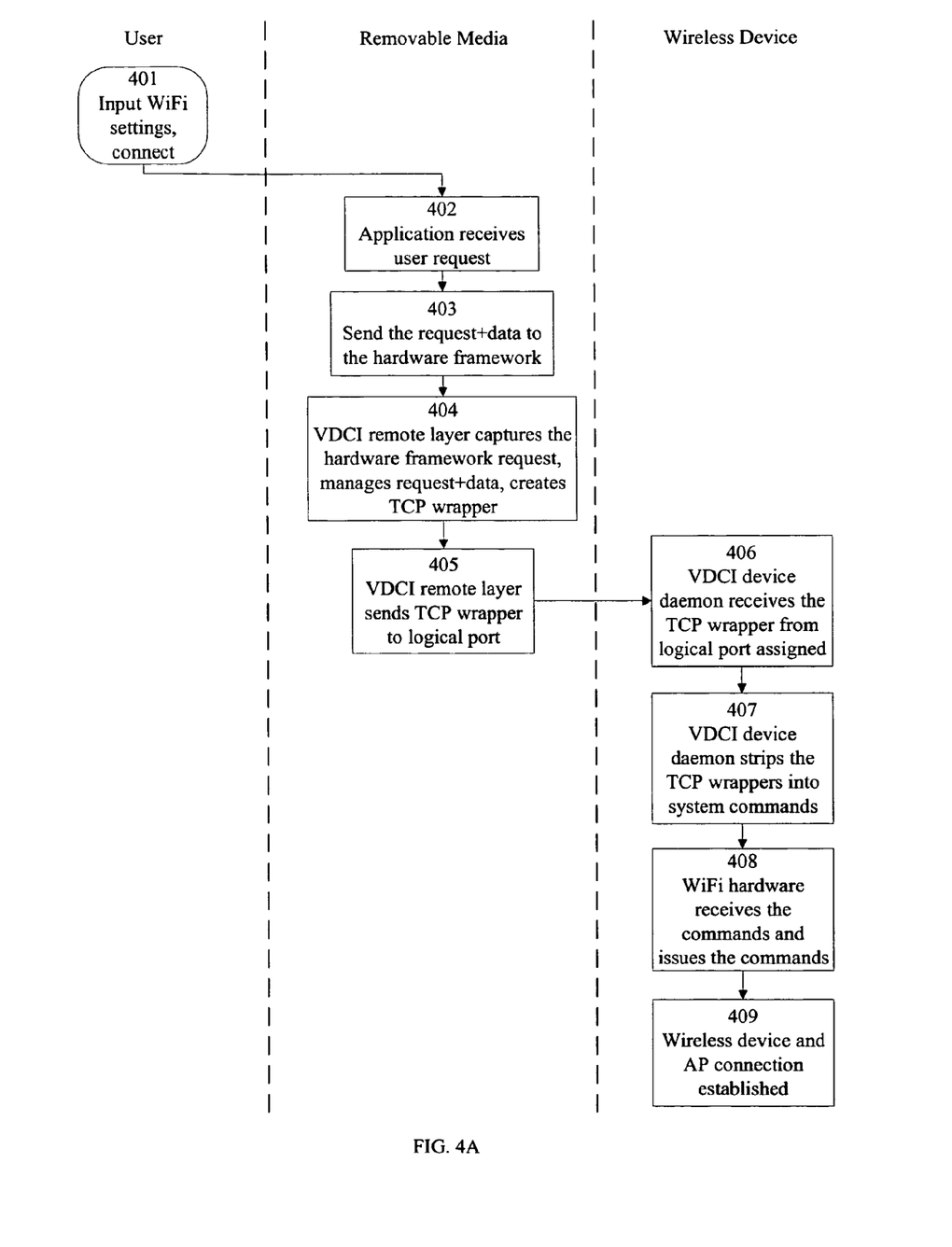
FIGS. 4A and 4B illustrate flow charts for the WiFi hardware request process according to one aspect of the system and method of the present disclosure.
Figure 4B:
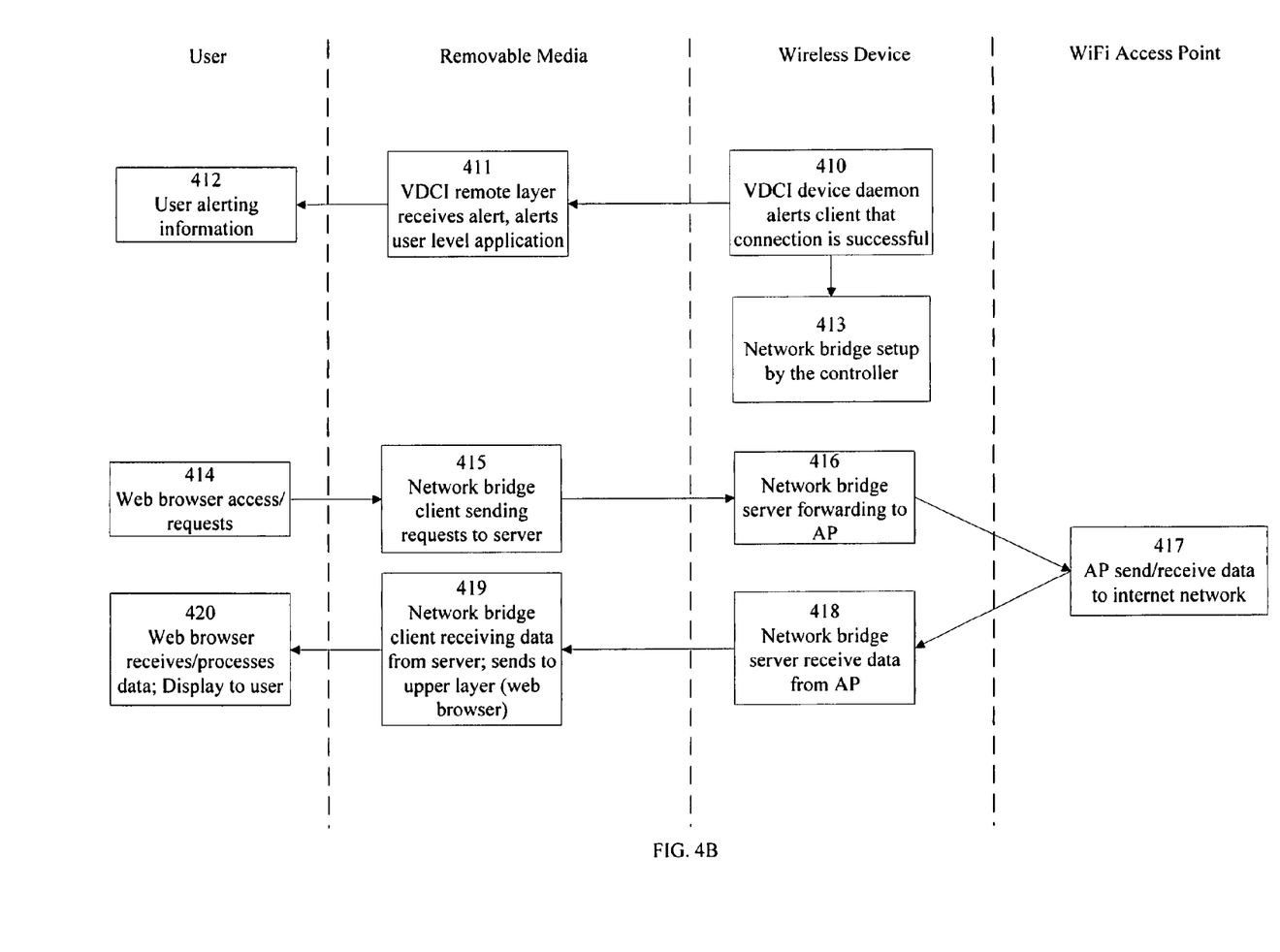

In another aspect, FIGS. 4A and 4B shows the flow chart for mapping WiFi hardware 112 to the VDCI remote layer 204 in a removable media device 202. First, a user may start a scan for WiFi access points, 401. The application may receive the request to start a scan for access points, 402, and send the request and data to the VDCI remote layer, 403. The VDCI remote layer may capture the request to start a scan and create a TCP/IP wrapper around the request and data, 404. The VDCI remote layer may then send the TCP/IP wrapper to a logical port assigned to the WiFi hardware, 405. The VDCI device daemon may receive the TCP/IP wrapper from the logical port assigned to the WiFi hardware, 406. The VDCI device daemon may strip the TCP/IP wrapper into system commands for the request to start a scan for access points and data, 407. The VDCI device daemon may send the commands to the WiFi hardware. The WiFi hardware may receive the commands and issue the commands, 408. The wireless device may then establish a connection to an access point, 409. The VDCI device daemon may then alert the VDCI remote layer that the connection is successful, 410. The VDCI remote layer may receive the alert, 411, and may pass the alert to the user application, 412. The VDCI device daemon may set up a network bridge using the controller on the terminal device, 413. A web browser may request network access from the network bridge, 414. A network bridge client may send the request to the server, 415. The network bridge may forward requests to the wireless access point, 416. The wireless access point may send and receive data to the network, 417. The network bridge may receive data from the wireless access point, 418. Next, the network bridge may forward the data to the web browser, 419. The web browser may receive and process the data, and may display the data to the user, 420.

In further aspects, each hardware device that is mapped may be assigned to a logical port through which it may communicate.

In one aspect, the VDCI device daemon 205 on the terminal 201 device may communicate the hardware configuration to the VDCI remote layer 204 on the removable media device 202. The VDCI remote layer 204 may assign a logical port to each hardware device reported by the VDCI device daemon 205. The logical ports may start, at 8889 for example, and may decrement the port address for each next hardware device present on the terminal device 201. The VDCI remote layer 204 may inform the VDCI device daemon 205 of the hardware device logical port assignments.

In a further aspect, port 8889, for example, may be assigned to map the WiFi hardware 112 from the terminal device 201 to the removable media device 202. When an application 103 or runtime environment 104 in the removable media device 202 requests a WiFi function, such as scanning for an access point, the VDCI remote layer 204 sends this command via port 8889 to the VDCI device daemon 205 in the terminal device 201. The VDCI device daemon 205 may then instruct the WiFi hardware 112 to scan and return a list of access points found through the same logical port 8889. The VDCI remote layer 204 may send the list of access points to the calling application 103 or runtime environment 104.

Figure 5:
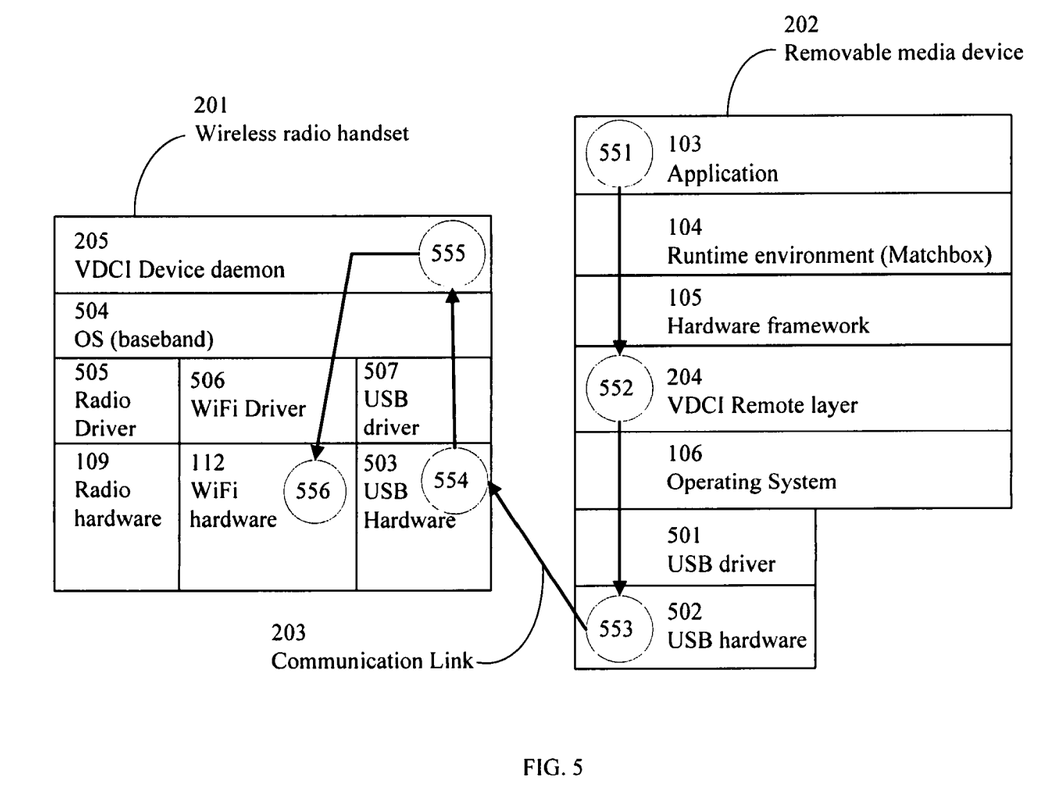
FIG. 5 illustrates a VDCI implementation for a wireless radio handset and removable media device according to one aspect of the system and method of the present disclosure.

According to one aspect, FIG. 5 shows the flow of information from an application 103 requesting access to WiFi hardware 112. In this aspect, a USB driver 501 may control the USB hardware 502 on the removable media device 202. The wireless radio handset 201 may also have a baseband processor 504, a radio driver 505 for radio hardware 109, a WiFi driver 506 for WiFi hardware 112, and a USB driver 507 for USB hardware 503.

The sequence is followed when an application 103 requests to set up a WiFi access point. The application may request the WiFi hardware 112 with a scan command, shown by 551. The VDCI remote layer 204 may captures this request for the WiFi hardware resource, and may encapsulate the command and data into a TCP/IP packet and send the packet to the communication link 203, shown by 552. The removable media device 202 may consider the terminal device 201 as a CDC RNDIS/Ethernet device and may send the TCP/IP packet to the terminal device 201 at a certain port number corresponding to the WiFi hardware 112, shown by 553. The terminal device 201 may receive the packet and may send the packet to the VDCI device daemon 205 on the terminal device 201, shown by 554. As shown by 555, the VDCI device daemon 205 on the terminal device 201 may listen to TCP/IP at a certain port number at a certain port number corresponding to the WiFi hardware 112. Once the packet is received, the VDCI device daemon 205 may remove the encapsulation from the packet. The VDCI device daemon 205 may check if the command is directly supported by the WiFi hardware 205, and may modify the command to ensure compatibility with the supported hardware command set. Different hardware configurations may still work because the VDCI device daemon 205 may change the command to conform to a supported command set. The VDCI device daemon 205 may pass the request to the WiFi hardware 112. The WiFi hardware 112 may receive the command and may execute the command, as shown by 556. Results from the command may return to the calling application 103 through the reverse order of information flow (e.g., 556 back to 551).

In one aspect, an OpenMoko Neo Free Runner handset may be used, though any hardware configuration is possible. In further aspects, handset applications and the runtime environment may be removed and replaced with the VDCI device daemon 205. In other aspects, a Samsung S3C2443 development board may be used as the removable media device 202. In one aspect, the hardware device driver may not be present in the removable media device 202. In a further aspect, the terminal device 201 may only have a VDCI device daemon 205 running on the baseband processor 504.

Figure 6:
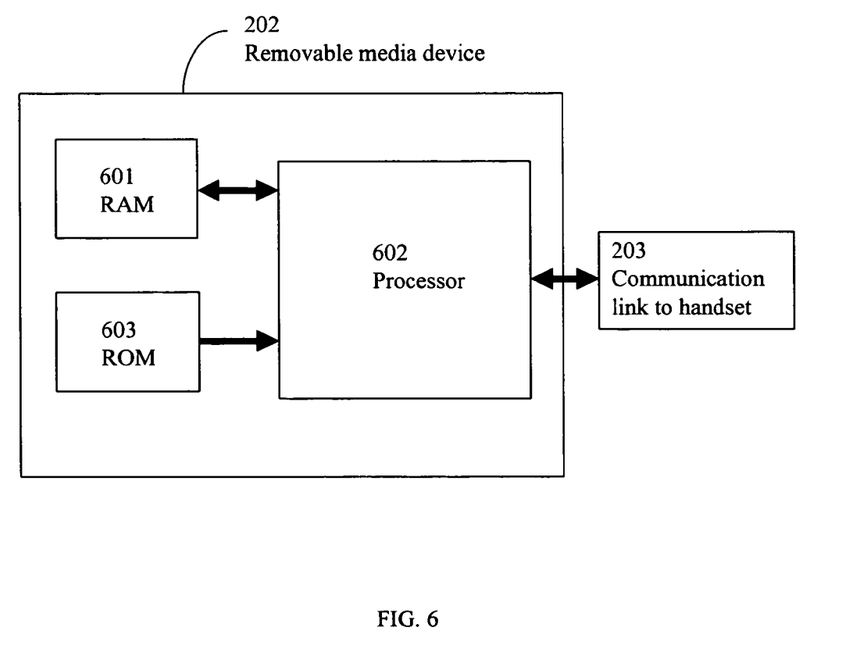
FIG. 6 illustrates a block diagram of the removable media device hardware design.

FIG. 6 illustrates a block diagram of the removable media device hardware design. In one aspect, the removable media device 202 may house a processor 602, a RAM 601, and a ROM 603. In further aspects, the removable media device may have a communication link 203 to communicate with the terminal device 201.

Linux may be chosen as an open source operating system for embodiments of this invention. Other operating systems available may include, but are not limited or restricted to Win CE, Symbian, or any other embedded operating system. Another aspect may include X Window, but any other graphic system may be used. Another aspect may include Openmoko OM 2008 as a runtime environment, but any runtime environment such as Android, QT, MontaVista, MatchBox, or any other runtime environment may be used.

Advantages of embodiments of the present invention may include one or more of the following: (1) cost separation between the terminal device and the removable media device; (2) product development, maintenance, and enhancement costs may decrease, especially for security products like EMV payment terminals; (3) security certification may accelerate on secure products due to the use of virtualization techniques; and (4) distribution may be simplified because an application may be stored in the removable media device.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed. Unless otherwise specifically stated, terms and expressions have been used herein as terms of description, not of limitation. Accordingly, the invention is not to be limited by the specific illustrated and described embodiments (or the terms or expressions used to describe them) but only by the scope of the claims.

The invention claimed is:

1. A method for virtualizing a peripheral device of a terminal device from a media device comprising:

issuing, by an application on a media device comprising a first memory and first processor coupled to said first memory, one or more commands for WIFI hardware on a terminal device;

capturing said commands and encapsulating said commands into a TCP/IP packet by a virtualization device control interface ("VDCI") remote layer on said media device;

sending, by said VDCI remote layer, said packet to said terminal device comprising a second memory, a second processor coupled to said second memory, and one or more peripheral devices configured to run on said second processor and said second memory, via a communication link connecting said media device and said terminal device;

receiving, by said second processor in said terminal device, said TCP/IP packet, and sending said TCP/IP packet to a VDCI device daemon on said terminal device;

unwrapping, by said VDCI device daemon, said commands from said TCP/IP packet;

submitting, by said VDCI device daemon, said commands to said WIFI hardware of said terminal device for execution; and executing, by said WIFI hardware, said commands.

2. The method of claim 1, wherein said communication link adheres to a SIM, SAM, SD, micro SD, or USB dongle form factor.

3. The method of claim 2, wherein said communication link includes a first USB hardware device on said media device and a second USB hardware device on said terminal device.

4. A method for virtualizing a peripheral device of a terminal device comprising a memory, processor, and one or more peripheral devices, from a media device, the method comprising:
  issuing, by an application on a media device comprising a memory and processor coupled to said memory, one or more commands for execution on a WIFI hardware of a terminal device;
  capturing, by a virtualization device control interface ("VDCI") remote layer on said media device, said commands, and encapsulating said commands into a TCP/IP packet;
  sending, by said media device via a communication link, said packet to a virtualization device control interface device daemon on the terminal device for execution of said commands.

5. The method of claim 4, wherein said communication link adheres to a SIM, SAM, SD, micro SD, or USB dongle form factor.

6. The method of claim 5, wherein said communication link includes a first USB hardware device on said media device and a second USB hardware device on said terminal device.

7. A method for virtualizing a peripheral device of a terminal device from a media device comprising a memory and processor, the method comprising:
  receiving, by a terminal device, a TCP/IP packet of encapsulated commands from a virtualization device control interface remote layer of a media device via a communication link;
  sending, by said terminal device, said TCP/IP packet to a virtualization device control interface ("VDCI") device daemon on said terminal device;
  unwrapping, by said VDCI device daemon, said commands from said TCP/IP packet;
  submitting, by said VDCI device daemon, said commands to a WIFI hardware of said terminal device for execution; and
  executing, by said WIFI hardware, said commands.

8. The method of claim 7, wherein said communication link adheres to a SIM, SAM, SD, micro SD, or USB dongle form factor.

9. The method of claim 8, wherein said communication link includes a first USB hardware device on said media device and a second USB hardware device on said terminal device.

10. A system for virtualizing a peripheral device of a terminal device from a media device comprising:
  a media device, including:
    a first memory;
    a first processor coupled to said first memory; and
    a virtualization device control interface ("VDCI") remote layer configured to run on said first processor and first memory; and
  a terminal device, including:
    a second processor;
    a second memory coupled to said second processor;
    one or more peripheral devices configured to run on said second processor and said second memory; and
    a VDCI device daemon;
  wherein an application on said media device is configured to issue one or more commands for WIFI hardware on said terminal device;
  wherein said VDCI remote layer is configured to:
    capture said commands;
    encapsulate said commands into a TCP/IP packet; and
    send said TCP/IP packet to said terminal device via a communication link;
  wherein said VDCI device daemon is configured to unwrap said encapsulated commands from said TCP/IP packet and to communicate with said WIFI hardware on said terminal device; and
  wherein said WIFI hardware on said terminal device is configured to execute said commands.

11. The system of claim 10, wherein said communication link adheres to a SIM, SAM, SD, micro SD, or USB dongle form factor.

12. The system of claim 11, wherein said communication link includes a first USB hardware device on said media device and a second USB hardware device on said terminal device.

13. A system for virtualizing a peripheral device of a terminal device comprising a memory, processor, and one or more peripheral devices, from a media device, the method comprising:
  a media device, including:
    a memory;
    a processor coupled to said memory; and
    a virtualization device control interface ("VDCI") remote layer configured to run on said processor and memory;
  wherein an application on said media device is configured to issue one or more commands for WIFI hardware on a terminal device;
  wherein said VDCI remote layer is configured to:
    capture said commands;
    encapsulate said commands into a TCP/IP packet; and
    send said TCP/IP packet to a virtualization device control interface device daemon on the terminal device via a communication link for execution of said commands by the WIFI hardware of the terminal device.

14. The system of claim 13, wherein said communication link adheres to a SIM, SAM, SD, micro SD, or USB dongle form factor.

15. The system of claim 14, wherein said communication link includes a first USB hardware device on said media device and a second USB hardware device on said terminal device.

16. A system for virtualizing a peripheral device of a terminal from a media device comprising a memory and processor, the method comprising:
  a terminal device, including:
    a processor;
    a memory coupled to said processor;

one or more peripheral devices configured to run on said processor and said memory; and a virtualization device control interface ("VDCI") device daemon;

wherein said terminal device is configured to receive, via a communication link, one or more encapsulated TCP/IP packets comprising one or more commands, said commands issued by an application of a media device and encapsulated by a virtualization device control interface remote layer of a media device;

wherein said VDCI device daemon is configured to unwrap said encapsulated commands from said TCP/IP packet and to communicate with a WIFI hardware on said terminal device; and wherein said WIFI hardware on said terminal device is configured to execute said commands.

17. The system of claim 16, wherein said communication link adheres to a SIM, SAM, SD, micro SD, or USB dongle form factor.

18. The system of claim 17, wherein said communication link includes a first USB hardware device on said media device and a second USB hardware device on said terminal device.

\* \* \* \* \*